(12) United States Patent
Kobayashi et al.

(10) Patent No.: US 7,002,735 B2
(45) Date of Patent: Feb. 21, 2006

(54) METHOD FOR DETECTING DISENGAGEMENT OF AN OPTICAL FIBER, AN OPTICAL FIBER AMPLIFIER, AND A UNIT OF AN OPTICAL FIBER AMPLIFIER WITH A TRANSMISSION OPTICAL FIBER

(75) Inventors: Yasuko Kobayashi, Sakura (JP); Ryo Sugimoto, Sakura (JP); Takuya Aizawa, Sakura (JP); Tetsuya Sakai, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/075,871

(22) Filed: Mar. 10, 2005

(65) Prior Publication Data

US 2005/0200944 A1    Sep. 15, 2005

(30) Foreign Application Priority Data

Mar. 12, 2004    (JP)    ............................. 2004-071118

(51) Int. Cl.
*H04B 10/12*    (2006.01)
*H04B 10/08*    (2006.01)

(52) U.S. Cl. .................................. 359/341.44; 398/21
(58) Field of Classification Search .......... 359/341.44; 398/21
See application file for complete search history.

(56) References Cited

U.S. PATENT DOCUMENTS 5,940,209 A * 8/1999 Nguyen ................... 359/341.1

2001/0050806 A1   12/2001   Sasaki

FOREIGN PATENT DOCUMENTS

| EP | 0954125 A2 | 11/1999 |
|----|------------|---------|
| JP | 6-177837 A | 6/1994 |
| JP | 7-15055 A | 1/1995 |
| JP | 7-240717 A | 9/1995 |
| JP | 2546499 B2 | 8/1996 |
| JP | H08-330649 A | 12/1996 |
| JP | 2696064 B2 | 9/1997 |
| JP | H11-121849 A | 4/1999 |
| JP | 2003-163642 A | 6/2003 |

* cited by examiner

*Primary Examiner*—Mark Hellner
(74) *Attorney, Agent, or Firm*—Sughrue Mion, PLLC

(57) ABSTRACT

A method for detecting a connector disengagement of an optical fiber amplifier and a transmission optical fiber connected thereto, the optical fiber amplifier including a doped optical fiber and a pumping light source, and a transmission optical fiber including at least one connecting portion connected to an output of the optical fiber amplifier, includes the steps of: measuring a reflection from the transmission optical fiber to the optical fiber amplifier; and comparing the reflection to an allowable range between a first threshold that is greater than a predetermined reflection in the absence of a connector disengagement, and a second threshold that is smaller than the predetermined reflection in the absence of a connector disengagement; determining that there is no connector disengagement when the measured reflection is within the allowable range; and determining that there is a connector disengagement otherwise.

14 Claims, 2 Drawing Sheets

METHOD FOR DETECTING DISENGAGEMENT OF AN OPTICAL FIBER, AN OPTICAL FIBER AMPLIFIER, AND A UNIT OF AN OPTICAL FIBER AMPLIFIER WITH A TRANSMISSION OPTICAL FIBER

BACKGROUND OF THE INVENTION

1. Field of the Invention

An embodiment of the present invention relates to a method for detecting a connector disengagement of an optical fiber amplifier having a rare earth doped optical fiber and a pumping light source, and a transmission optical fiber having at least one connector connecting portion connected to an output of the optical fiber amplifier, and relates to an optical fiber amplifier, and to a unit of an optical fiber amplifier and a transmission optical fiber connected thereto in which safety against disengagement of a connector is improved.

Priority is claimed to Japanese Patent Application No. 2004-71118, filed Mar. 12, 2004, the content of which is incorporated herein by reference.

2. Description of Related Art

Conventionally, an optical fiber amplifier, having a doped optical fiber that is doped with a rare-earth element, such as erbium, and a pumping light source, and a transmission optical fiber, having at least one connector connecting portion connected to an output of the optical fiber amplifier, forming a unit, has been proposed. In such a unit, an optical signal amplified in the optical fiber amplifier is transmitted via the transmission optical fiber.

In operation, high-power optical signal is continuously output from the optical fiber amplifier. The output-side connector of the optical fiber amplifier may accidentally be disengaged during maintenance activity, which may cause serious damage if the light emitted from the optical fiber is directly incident on an eye or the skin of a technician.

In a conventional technique, in order to prevent such an accident, an optical fiber amplifier was proposed in which connector disengagement of an output-side connector of a transmission optical fiber connected the optical fiber amplifier can be detected by monitoring reflected light of the optical signal from the disengaged connector, and output power is automatically halted or reduced upon detection of the connector disengagement (see Japanese Patent Nos. 2546499 and 2696064, and Japanese Unexamined Patent Application, First Publication No. H08-330649, for example).

Furthermore, in an optical transmission system, an optical fiber that is used to couple between an optical module, optical unit, or optical transmission unit may be broken, or a connector of an optical fiber amplifier may be disengaged, both of which may cause harm to technicians. Therefore, safety measures to prevent such accidents have been mandated (see Japanese Unexamined Patent Application, First Publication No. H11-121849, for example).

In addition, in recent years, an optical transmission unit and an optical transmission module have been proposed in which a connector disengagement or breakage of optical fiber can be detected by employing a simple circuit and conventional optical components without reducing optical signal output level (see Japanese Unexamined Patent Application, First Publication No. 2003-163642, for example).

In a conventional technique, a disengagement of an output-side connector in an optical fiber amplifier and a transmission optical fiber forming a unit is detected by measuring Fresnel reflection light from the output-side connector, and in this technique, it is assumed that the output-side connector is a non-angled end face connector, and an abutting end face is formed on a surface perpendicular to the longitudinal direction of the optical fiber, and connector disengagement is detected when the amount of reflected light is increased.

However, with this conventional technique, when an output-side angled end face connector in which an abutting end face is formed on a surface which is angled with respect to the longitudinal direction of the optical fiber is used as an output-side connector, the amount of reflected light from the disengaged connector becomes smaller compared to the amount of reflected light when the connector is engaged. Thus, connector disengagement cannot be detected.

SUMMARY OF THE INVENTION

The present invention was conceived in view of the above-mentioned background, and an aspect thereof is to provide a method for detecting a disengagement of an output-side connector in an optical fiber amplifier and a transmission optical connected to the optical fiber amplifier via the output-side connector, an optical fiber amplifier, and an optical fiber amplifier and a transmission optical fiber connected to the optical fiber forming a unit that can accurately detect a disengagement of an output connector and can enhance the safety even when the transmission optical fiber has an angled end face connector.

In order to achieve the above-mentioned aspect, the present invention provides a method for detecting a connector disengagement of an optical fiber amplifier and a transmission optical fiber connected to the optical fiber amplifier, the optical fiber amplifier including a rare earth doped optical fiber and a pumping light source, and a transmission optical fiber including at least one connector connecting portion connected to an output of the optical fiber amplifier, including the steps of: measuring a reflection from the transmission optical fiber to the optical fiber amplifier, the reflection being given as a ratio to a power of a reflected light and a power of an output optical signal; comparing the reflection to an allowable range between a first threshold that is greater than a predetermined reflection in the absence of a connector disengagement, and a second threshold that is smaller than the predetermined reflection in the absence of a connector disengagement; determining that there is no connector disengagement when the measured reflection is within the allowable range; and determining that there is a connector disengagement when the reflection is out of the allowable range.

Preferably, in the detecting method of the present invention, the transmission optical fiber has an angled end face connector that is provided at an output of the optical fiber amplifier, and a non-angled end face connector that is provided at an output of the transmission optical fiber, and the method further includes the steps of: measuring the reflection in the optical fiber amplifier and the transmission optical fiber connected to the optical fiber amplifier in Case (i) in which the non-angled end face connector is disengaged; measuring the reflection in the optical fiber amplifier and the transmission optical fiber connected to the optical fiber amplifier in Case (ii) in which the angled end face connector is disengaged; measuring the reflection in the optical fiber amplifier and the transmission optical fiber connected to the optical fiber amplifier in Case (iii) in which both of the connectors are adequately connected and function properly; selecting a first predetermined threshold "a" and a second predetermined threshold "b" so that the following inequalities are satisfied: the reflection in Case (iii)<a<the reflection in Case (i), and the reflection in Case (ii)<b<the reflection in Case (iii); measuring a reflection from the transmission optical fiber to the optical fiber amplifier determining that there is no connector disengagement when the reflection is within a range between "a" and "b"; and determining that there is a connector disengagement when the reflection is out of the range between "a" and "b" connector disengagement.

Furthermore, in a detection method of the present invention, a detection level of the reflection is preferably varied according to a length of the transmission optical fiber that is connected to an optical fiber amplifier.

Furthermore, the present invention provides an optical fiber amplifier including: a rare earth doped optical fiber; a pumping light source; a reflection detector that, when a transmission optical fiber including at least one connector connecting portion is connected to an output of the optical fiber amplifier via the connector connecting portion, measures a reflection from the transmission optical fiber to the optical fiber amplifier; and a control unit that compares the reflection measured by the reflection detector to an allowable range between a first threshold that is greater than a predetermined reflection in the absence of a connector disengagement, and a second threshold that is smaller than the predetermined reflection in the absence of a connector disengagement, determines that there is no connector disengagement when the measured reflection is within the allowable range, and determines that there is a connector disengagement when the reflection is out of the allowable range.

Furthermore, in a preferable embodiment of the present invention, when the transmission optical fiber that has an angled end face connector that is provided at an output of the optical fiber amplifier, and a non-angled end face connector that is provided at an output of the transmission optical fiber is connected to an output of the optical fiber amplifier, the control unit preferably measures reflections of each of the following Cases (1) to (3): (1) a non-angled connector at the output of the optical fiber amplifier is disengaged; (2) an angled connector at an output of the transmission optical fiber is disengaged; and (3) both of the connectors are adequately connected and function properly. Then, the control unit selects a first predetermined threshold "a" and a second predetermined threshold "b" so that the following inequalities are satisfied: the reflection in Case (iii)<a<the reflection in Case (i), and the reflection in Case (ii)<b<the reflection in Case (iii), and stores the first predetermined threshold "a" and the second predetermined threshold "b." The control unit determines that there is no connector disengagement when the reflection is within a range between "a" and "b," and determines that there is a connector disengagement when the reflection is out of the range between "a" and "b."

In addition, the control unit preferably controls the pumping light source so that the output from the pumping light source is reduced or halted when the control unit determines that there is a connector disengagement.

Furthermore, the control unit preferably varies a detection level of the reflection according to the length of a transmission optical fiber that is connected to the optical fiber amplifier.

The present invention provides a unit of the above-described optical fiber amplifier and a transmission optical fiber including at least one connector connecting portion connected to an output of the optical fiber amplifier.

According to the present invention, the reflection from the transmission optical fiber to the optical fiber amplifier is measured, and the reflection is compared to an allowable range between a first threshold that is greater than a predetermined reflection in the absence of a connector disengagement, and a second threshold that is smaller than the predetermined reflection in the absence of a connector disengagement. Then, it is determined that there is no connector disengagement when the measured reflection is within the allowable range, and it is determined that there is a connector disengagement when the reflection is out of the allowable range. Thus, in a transmission optical fiber having an output-side non-angled end face connector and an output-side angled end face connector, it is ensured that any connector disengagement of either of the connectors can be detected, and such a disengagement is immediately corrected. Accordingly, safety of the unit of an optical fiber amplifier and a transmission optical fiber can be enhanced.

Furthermore, in an optical fiber amplifier and a transmission optical fiber connected to the optical fiber amplifier forming a unit that can detect a connector disengagement, the reflection is measured in each of the following Cases (1) to (3): (1) a non-angled connector at the output of the optical fiber amplifier is disengaged; (2) an angled connector at an output of the transmission optical fiber is disengaged; and (3) both of the connectors are adequately connected and function properly. Then, a first predetermined threshold "a" and a second predetermined threshold "b" are selected so that the following inequalities are satisfied: the reflection in Case (iii)<a<the reflection in Case (i), and the reflection in Case (ii)<b<the reflection in Case (iii). It is determined that there is no connector disengagement when the measured reflection is within a range between "a" and "b." It is determined that there is a connector disengagement when the reflection is out of the range between "a" and "b." Thus, in a transmission optical fiber the transmission optical fiber has an angled end face connector that is provided at an output of the optical fiber amplifier, and a non-angled end face connector that is provided at an output of the transmission optical fiber, it is further ensured that any connector disengagement of either of the connectors can be detected. Accordingly, safety can be further enhanced.

DETAILED DESCRIPTION OF THE INVENTION

Hereinafter, embodiments of the present invention will be described with reference to the drawings.

Figure 1:
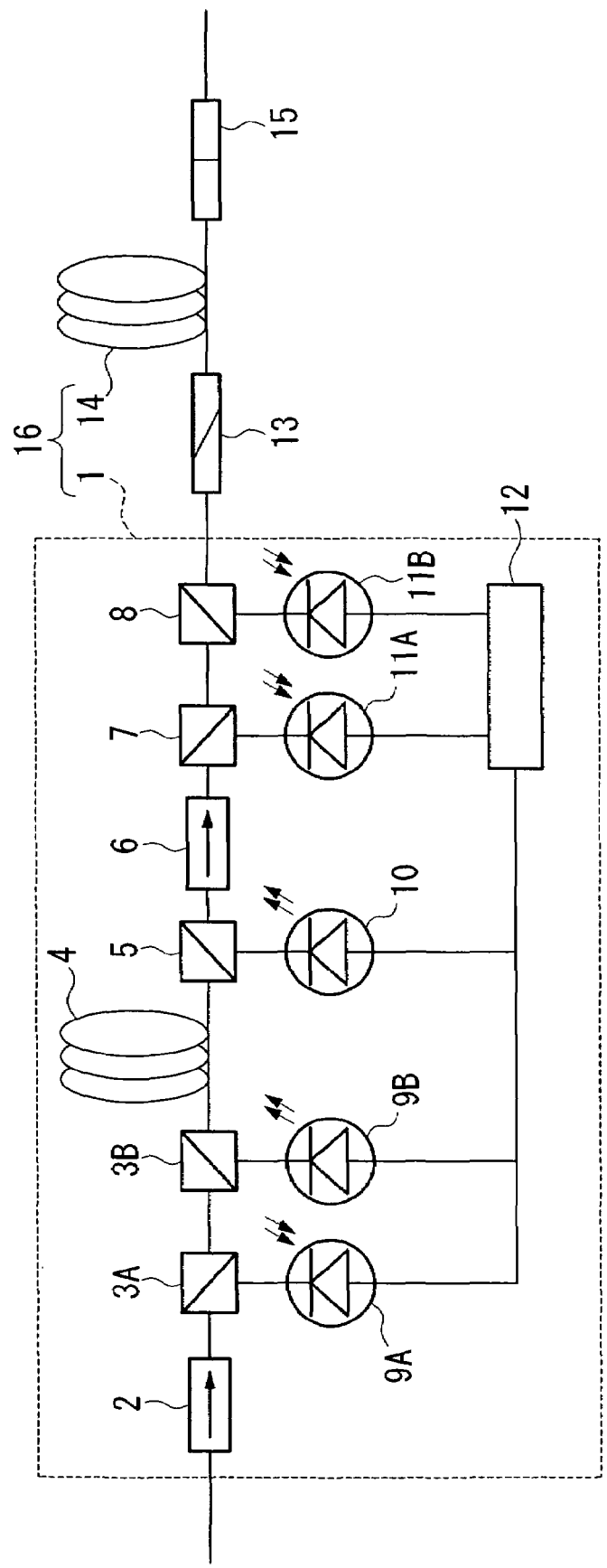
FIG. 1 is a schematic diagram illustrating an example of an optical fiber amplifier, and the optical fiber amplifier and a transmission optical fiber connected thereto that form a unit according to the present invention.

FIG. 1 is a schematic diagram illustrating an example of an optical fiber amplifier 1 and a transmission optical fiber connected thereto that form a unit 16 according to the present invention. The unit 16 of the optical fiber amplifier and the transmission optical fiber connected thereto according to the present invention includes an optical fiber amplifier 1 having a rare earth doped optical fiber 4 and at least one of pumping light sources 9B and 10 as a pumping light source, and a transmission optical fiber 14 connected to an output of the optical fiber amplifier 1 via connectors. An angled end face connector (hereinafter, referred to as the "angled connector 13") is provided at the output of the optical fiber amplifier 1, and a non-angled end face connector (hereinafter, referred to as a "non-angled connector 15") is provided at the output of the transmission optical fiber 14. The non-angled connector 15 is a connector having an abutting end face that is formed on a surface perpendicular to the longitudinal direction of the optical fiber. The angled connector 13 is a connector having an abutting end face that is formed on a surface angled with respect to the longitudinal direction of the optical fiber.

In this embodiment, the optical fiber amplifier 1 includes the rare earth doped optical fiber 4, the pumping light sources 9B and 10, an optical coupler 3A, a photodiode 9A, isolators 2 and 6, an optical coupler 7, a photodiode 11A, an optical coupler 8, a photodiode 11B, and a control unit 12. The rare earth doped optical fiber 4 is doped with a rare-earth element, such as erbium, into a core, and functions as a laser medium of the optical fiber amplifier. The pumping light sources 9B and 10 emit excitation light to the rare earth doped optical fiber 4 via wavelength division multiplexing (WDM) couplers 3B and 5, respectively. The optical coupler 3A is provided in front of the optical signal input-side WDM coupler 3B. The photodiode 9A is connected to the optical coupler 3A and detects the power of the input signal. The isolators 2 and 6 are provided in front of the optical coupler 3A and at the back of the WDM coupler 5, respectively. The optical coupler 7 is provided at the back of the optical signal output-side isolator 6. The photodiode 11A is connected to the optical coupler 7 and detects the power of the output signal. The optical coupler 8 is provided at the back of the optical coupler 7. The photodiode 11B is provided at the back of the optical coupler 8, and measures reflection from the transmission optical fiber 14 to the optical fiber amplifier 1, functioning as a reflection detector. The control unit 12 receives data related to the input signal power, the output signal power, and the reflection from the photodiode 9A, 11A, and 11B, respectively, and outputs a control signal indicating the amount of the excitation light to the two pumping light sources 9B and 10. Here, the reflection is given as a ratio to a power of a reflected light and a power of an output optical signal.

The control unit 12 is configured to compare the reflection from the photodiode 11B that functions as a reflection detector to an allowable range between a first threshold that is greater than a predetermined reflection in the absence of a connector disengagement, and a second threshold that is smaller than the predetermined reflection in the absence of a connector disengagement. The control unit 12 is further configured to determine that there is no connector disengagement when the measured reflection is within the allowable range, and to determine that there is a connector disengagement when the reflection is out of the allowable range.

Furthermore, in an embodiment of the present invention, once the transmission optical fiber 14 having an angled connector 13 at the output of the optical fiber amplifier 1 and a non-angled connector 15 at the output of the optical fiber amplifier 1 is connected to the output of the output of the optical fiber amplifier 1, before an actual measurement, the control unit 12 preferably measures reflections of each of the following Cases (1) to (3): (1) the non-angled connector 15 is disengaged; (2) the angled connector 13 is disengaged; and (3) both of the connectors 13 and 15 are adequately connected and function properly, under a condition in which generation of stimulated Brillouin scattering is inhibited. Then, the control unit 12 selects a first predetermined threshold "a" and a second predetermined threshold "b" so that the following inequalities are satisfied: the reflection in Case (iii)<a<the reflection in Case (i), and the reflection in Case (ii)<b<the reflection in Case (iii), and stores the first predetermined threshold "a" and the second predetermined threshold and "b." In an actual measurement, the control unit 12 receives data of the reflection from the transmission optical fiber 14 to the optical fiber amplifier 1 measured by the photodiode 11B that functions as a reflection detector, and determines that there is no connector disengagement when the reflection is within a range between "a" and "b," and determines that there is a connector disengagement when the reflection is out of the range between "a" and "b."

In addition, the control unit 12 preferably controls the pumping light source 9B and 10 so that the output from the pumping light sources 9B and 10 is reduced or halted when the control unit 12 determines that there is a connector disengagement.

Furthermore, the control unit 12 preferably varies a detection level of the reflection according to the length of a transmission optical fiber that is connected to the optical fiber amplifier 1.

While in certain embodiments the invention describes a reflection from the optical amplifier 1 to and from the angled connector 13 and to and from the non-angled connector 15, this arrangement of components is merely exemplary. That is, the angled and non-angled connectors could be interchanged between a first and second position in relation to an ordered location from the optical amplifier 1. Further, the angled and non-angled connectors could be other forms of connectors and interconnects. The invention is not limited specifically to angled and non-angled connectors, nor to a strict ordered placement of connector types in relation to ordered location from the optical amplifier 1.

Next, a method for detecting a connector disengagement according to the present invention will be described using a unit 16 of an optical fiber amplifier having the above-described configuration, and a transmission optical fiber 14 having a non-angled connector 15 and an angled connector 13.

In the detection method of the present invention, reflection from the transmission optical fiber 14 to the optical fiber amplifier 1 is measured. The reflection is then compared to an allowable range between a first threshold that is greater than a predetermined reflection in the absence of a connector disengagement, and a second threshold that is smaller than the predetermined reflection in the absence of a connector disengagement. It is determined that there is no connector disengagement when the measured reflection is within the allowable range. Otherwise, it is determined that there is a connector disengagement when the reflection is out of the allowable range.

More specifically, before an actual measurement, a first threshold "a" expressed by the inequality: the reflection in Case (iii)<a<the reflection in Case (i), and a second threshold "b" expressed by the inequality: the reflection in Case (ii)<b<the reflection in Case (iii) have been determined. By this, reflections of each of the following Cases (1) to (3) are measured in advance: (1) the non-angled connector 15 is disengaged; (2) the angled connector 13 is disengaged; and (3) both of the connectors 13 and 15 are adequately connected and function properly. In an actual measurement, reflection from the transmission optical fiber to the optical fiber amplifier is measured, and it is determined that there is no connector disengagement when the reflection is within a range between "a" and "b." Otherwise, a determination is made that there is a connector disengagement when the reflection is out of the range between "a" and "b."

In the above-described Case (i), e.g., when the non-angled connector 15 is disengaged, Fresnel reflection is caused by the disengagement of the non-angled connector that is provided at the back of the transmission optical fiber 14 at the end face of the non-angled connector, in addition to the reflection due to Rayleigh scattering.

In the above-described Case (ii), e.g., when the angled connector 13 is disengaged, there is almost no reflection. This is because there is no reflection due to Rayleigh scattering since the transmission optical fiber 14 is no longer connected, and because Fresnel reflection from the angled connector 13 is negligibly small.

In the above-described Case (iii), e.g., when both of the connectors 13 and 15 are adequately connected and function properly, reflection due to Rayleigh scattering at the transmission optical fiber 14 is observed.

In order to detect connector disengagement, the differences between the amounts of reflected light at each of the path returning to the optical fiber amplifier 1 are determined. The relationships between the reflections measures in each of the above-described Cases (1) to (3) are as follows: the reflection in Case (i)>the reflection in Case (iii), and the reflection in Case (ii)<the reflection in Case (iii). Therefore, an upper limit (i.e., a first threshold "a") is set to a value between the reflection in Case (i) and the reflection in Case (iii), and a lower limit (i.e., a second threshold "b") is set to a value between the reflection in Case (iii) and the reflection in Case (ii). It is desirable that the thresholds "a" and "b" be selected so that it is assured that any disengagement of any of the connectors is detected, and that a detection error of connector disengagement due to an increase in the reflected light caused by bending during handling of the transmission optical fiber 14 or the like, or due to slight fluctuation of the reflection caused by stray light or the like, can be avoided.

Once the first and second thresholds "a" and "b" are set and are input into the control unit 12, reflection in the unit 16 of an optical fiber amplifier and a transmission optical fiber connected to the optical fiber amplifier is monitored to determine whether there is a connector disengagement or not.

If any of the connectors 13 and 15B is disengaged during monitoring, the reflection that is detected by the photodiode 11B and is input into the control unit 12 will departure from the allowable range between the first threshold "a" and the second threshold "b." When the reflection exceeds the first threshold "a," the non-angled connector 15 is disengaged. When the reflection is less than the second threshold "b," the angled connector 13 is disengaged. When it is determined that there is a connector disengagement, the control unit 12 sends a control signal to the two pumping light sources 9B and 10, instructing to reduce or halt the output of the excitation light. The control signal causes the excitation light from the pumping light sources 9B and 10 to be reduced or halted, and as a result, the output of the amplified light from the optical fiber amplifier 1 is then reduced or halted. In addition to controlling the output from the pumping light sources 9B and 10, the control unit 12 sends information on the detected connector disengagement to a notification unit. The notification unit displays this information, and/or notifies of the connector disengagement by means of sound; thus maintenance technicians can immediately take any suitable repair measure based on the information. Once the connector disengagement is rectified, monitoring of connector disengagement is resumed.

In this method for detecting a connector disengagement, the upper limit (i.e., first threshold "a") for detecting reflection caused by disengagement of the non-angled connector 15 is selected according to the length of the transmission optical fiber 14. This enables making estimation of reflection caused by a disengagement of the non-angled connector 15 based on transmission distance of the optical fiber, and threshold for detecting a disengagement of the non-angled connector 15 is properly selected.

Since the reflected light is continuously monitored in the method for a connector disengagement according to the present invention, breakage of optical fibers can be detected as well as connector disengagements because change in reflected light upon breakage of the transmission optical fiber 14 can be detected, and necessary measures can be taken to repair the breakage.

EXAMPLES

As shown in FIG. 1, an optical fiber amplifier and a transmission optical fiber connected to the output of the optical fiber amplifier that form a unit 16 was assembled by connecting the optical fiber amplifier 1, having the optical couplers 7 and 8 for measuring reflection, the photodiodes 11A and 11B, and the control unit 12, to the transmission optical fiber 14, having the angled connector 13 and the non-angled connector 15, and detection of a connector disengagement was attempted.

A 10 m-long erbium-doped optical fiber (EDF) was used as the rare earth doped optical fiber 4 in the optical fiber amplifier 1. Semiconductor lasers were used as the pumping light sources 9B and 10, and excitation light in a wavelength band of 980 $\mu$m and a power of 100 mW was emitted from each of the pumping light sources 9B and 10 to the rare earth doped optical fiber 4 via the WDM couplers 3B and 5, respectively.

A 20 km-long silica-based single-mode optical fiber (abbreviated as "SMF" in FIG. 2) was used as the transmission optical fiber 14, and was connected to the output of the optical fiber amplifier 1 using the angled connector 13. The non-angled connector 15 was provided at the back of the transmission optical fiber 14.

A signal of 15 dBm to 19 dBm was emitted from the output of the optical coupler 8 in the optical fiber amplifier 1. The relationship between the output optical signal power of the optical fiber amplifier and the reflection were examined for each of the following four cases: (a) a non-angled connector was provided on the SMF at the distance of 0 km (at the position in which the angled end face connector in FIG. 1) of the SMF, and the connector was disengaged (labeled as "DISENGAGEMENT OF NON-ANGLED CONNECTOR OF SMF AT 0 km" in FIG. 2); (b) the non-angled connector 15 that was provided at 20 km on the SMF was disengaged in the configuration shown in FIG. 1 (labeled as "DISENGAGEMENT OF NON-ANGLED CONNECTOR OF SMF at 20 km" in FIG. 2); (c) both of the connectors were adequately connected (labeled as "CONNECTORS ARE ENGAGED (NORMAL CONNECTOR ENGAGEMENT)" in FIG. 2); and (d) the angled connector 13 was disengaged (labeled as "DISENGAGEMENT OF OUTPUT-SIDE ANGLED CONNECTOR" in FIG. 2).

Figure 2:
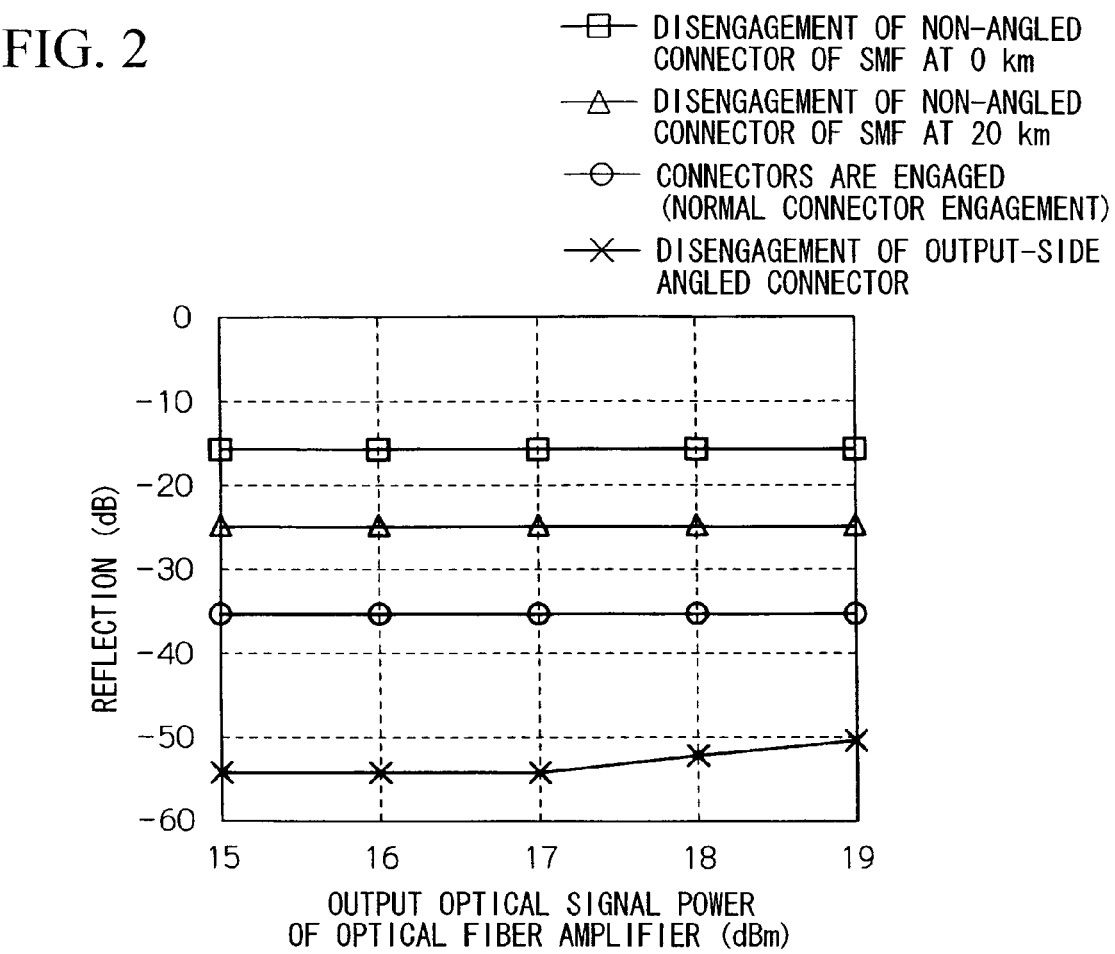
FIG. 2 is a graph of the output optical signal power of the optical fiber amplifier versus reflection in Example of the present invention in which any of connectors was disengaged or both of the connectors were adequately connected.

FIG. 2 is a graph of reflection versus the output optical signal power of the optical fiber amplifier and when stimulated Brillouin scattering is inhibited. The reflection was about −35 dB when both of the connectors were adequately connected when light was propagated under the condition in which the stimulated Brillouin scattering is inhibited. In contrast, the reflection was −50 dB or less when the angled connector 13 was disengaged.

Furthermore, when the non-angled connector 15 at the back of the transmission optical fiber was disengaged, although the reflection was reduced in relation to the length of the transmission optical fiber 14, the reflection was increased compared to the case in which both of the connectors were connected. Based on the results, the first threshold "a" was set to a value between −25 and −35 dB, and the second threshold "b" was set to a value between −40 and −50 dB in this Example.

Figure 3:
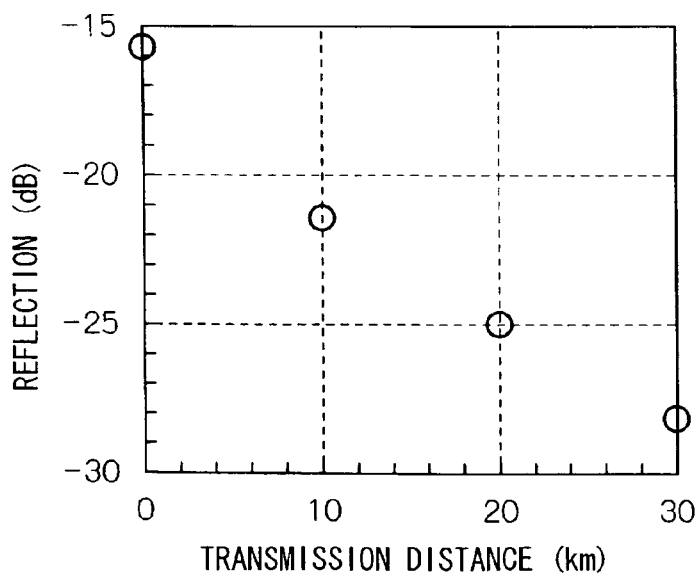
FIG. 3 is a graph of reflection versus the transmission distance of the transmission optical fiber in Example of the present invention in which any connectors were disengaged.

FIG. 3 is a graph of reflection versus the transmission distance when the non-angled connector 15 at the back of the transmission optical fiber was disengaged. It is possible to estimate reflection upon a disengagement of the connector 15 using the relationship of this graph, and the threshold for detecting the disengagement of the connector 15 can be properly selected.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for detecting a connector disengagement of an optical fiber amplifier and a transmission optical fiber connected to the optical fiber amplifier, the optical fiber amplifier comprising a doped optical fiber and a pumping light source, and a transmission optical fiber comprising at least one connecting portion connected to an output of the optical fiber amplifier, the method comprising:

measuring a reflection from the transmission optical fiber to the optical fiber amplifier, the reflection being given as a power ratio of a reflected light and an output optical signal;

comparing the reflection to an allowable range between a first threshold that is greater than a predetermined reflection in the absence of a connector disengagement, and a second threshold that is smaller than the predetermined reflection in the absence of a connector disengagement;

determining that there is no connector disengagement when the measured reflection is within the allowable range; and determining that there is a connector disengagement when the reflection is out of the allowable range.

2. The method for detecting a connector disengagement according to claim 1, wherein the transmission optical fiber has a first connector that is provided at an output of the optical fiber amplifier, and a second connector that is provided at an output of the transmission optical fiber, and the method further comprises:

measuring the reflection in the optical fiber amplifier and the transmission optical fiber connected to the optical fiber amplifier in Case (i) in which the second connector is disengaged;

measuring the reflection in the optical fiber amplifier and the transmission optical fiber connected to the optical fiber amplifier in Case (ii) in which the first connector is disengaged;

measuring the reflection in the optical fiber amplifier and the transmission optical fiber connected to the optical fiber amplifier in Case (iii) in which both of the first and second connectors are adequately connected and function properly;

selecting a first predetermined threshold "a" and a second predetermined threshold "b" so that the following conditions are satisfied: "a" is within a range between the reflection in Case (iii) and that in Case (i), and "b" is within a range between the reflection in Case (ii) and that in Case (iii);

measuring a reflection from the transmission optical fiber to the optical fiber amplifier;

determining that there is no connector disengagement when the reflection is within a range between "a" and "b"; and determining that there is a connector disengagement when the reflection is out of the range between "a" and "b."

3. The method for detecting a connector disengagement according to claim 1, further comprising varying a detection level of the reflection according to a length of the transmission optical fiber.

4. An optical fiber amplifier comprising:

a doped optical fiber;

a pumping light source;

a reflection detector that, when a transmission optical fiber comprising at least one connecting portion is connected to an output of the optical fiber amplifier via the connecting portion, measures a reflection from the transmission optical fiber to the optical fiber amplifier; and a control unit that compares the reflection measured by the reflection detector to an allowable range between a first threshold that is greater than a predetermined reflection in the absence of a connector disengagement, and a second threshold that is smaller than the predetermined reflection in the absence of a connector disengagement, determines that there is no connector disengagement when the measured reflection is within the allowable range, and also determines that there is a connector disengagement when the reflection is out of the allowable range.

5. The optical fiber amplifier according to claim 4, wherein the transmission optical fiber comprises a first connector that is provided at an output of the optical fiber amplifier and second connector that is provided at an output of the transmission optical fiber; and further wherein the control unit measures reflections of each of the following Cases (1) to (3): (1) when the second connector is disengaged; (2) when the first connector is disengaged; and (3) when both of the first and second connectors are adequately connected; and said control unit inputs a first predetermined threshold "a" and a second predetermined threshold "b" so that the following conditions are satisfied: "a" is within a range between the reflection in Case (iii) and that in Case (i), and "b" is within a range between the reflection in Case (ii) and that in Case (iii), and wherein said control unit stores the first predetermined threshold "a" and the second predetermined threshold "b"; and said control unit also receives data of the reflection from the transmission optical fiber to the optical fiber amplifier measured by the reflection detector, and determines that there is no connector disengagement when the reflection is within a range between "a" and "b," and determines that there is a connector disengagement when the reflection is out of the range between "a" and "b."

6. The optical fiber amplifier according to claim 4, wherein the control unit controls the pumping light source so that an output from the pumping light source is reduced or halted when it determined that there is a connector disengagement.

7. The optical fiber amplifier according to claim 4, wherein the control unit varies a detection level of the reflection according to a length of the transmission optical fiber.

8. A unit of an optical fiber amplifier and a transmission optical fiber, comprising:
the optical fiber amplifier according to claim 4; and
a transmission optical fiber comprising at least one connecting portion connected to an output of the optical fiber amplifier.

9. The method of claim 1, wherein the doped optical fiber comprises a rare earth dopant.

10. The optical fiber amplifier of claim 4 wherein the doped optical fiber comprises a rare earth dopant.

11. The method of claim 2, wherein the first connector is an angled end face connector and the second connector is a non-angled end face connector.

12. The optical fiber amplifier of claim 5, wherein the first connector is an angled end face connector and the second connector is a non-angled end face connector.

13. The method of claim 2, wherein the first connector is a non-angled end face connector and the second connector is an angled end face connector.

14. The optical fiber amplifier of claim 5, wherein the first connector is a non-angled end face connector and the second connector is an angled end face connector.

* * * * *